United States Patent
Nordman

(10) Patent No.: US 10,144,497 B2
(45) Date of Patent: Dec. 4, 2018

(54) HAT SECTION DOOR FRAME WITH INTEGRAL GUSSETS

(71) Applicant: The Boeing Company, Chicago, IL (US)

(72) Inventor: Paul S. Nordman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 275 days.

(21) Appl. No.: 15/131,268

(22) Filed: Apr. 18, 2016

(65) Prior Publication Data

US 2017/0297676 A1  Oct. 19, 2017

(51) Int. Cl.
*B64C 1/06* (2006.01)
*B64C 1/14* (2006.01)

(52) U.S. Cl.
CPC ............ *B64C 1/1461* (2013.01); *B64C 1/068* (2013.01)

(58) Field of Classification Search
CPC ........... B64C 1/061; B64C 1/068; B64C 1/24; B64C 1/14; B64C 1/1407; B64C 1/1423; B64C 1/143; B64C 1/1438; B64C 1/1461
USPC ....................................................... 244/119
See application file for complete search history.

(56) References Cited

U.S. PATENT DOCUMENTS

| | | | | |
|---|---|---|---|---|
| 4,720,065 A | * | 1/1988 | Hamatani | B64C 1/1407 244/129.5 |
| 5,064,147 A | * | 11/1991 | Noble | B64C 1/1407 244/129.5 |
| 5,289,615 A | * | 3/1994 | Banks | B64C 1/1407 16/366 |
| 5,305,969 A | * | 4/1994 | Odell | B64C 1/1407 244/129.5 |
| 5,931,415 A | * | 8/1999 | Lingard | B64C 1/143 244/129.4 |
| 7,527,222 B2 | * | 5/2009 | Biornstad | B29C 53/587 244/119 |
| 8,146,863 B2 | | 4/2012 | Larcher | |
| 9,067,670 B2 | | 6/2015 | Dugerie et al. | |
| 9,145,196 B2 | * | 9/2015 | Paul | B64C 1/1407 |
| 2002/0000494 A1 | * | 1/2002 | Bold | B22C 9/02 244/129.5 |

(Continued)

FOREIGN PATENT DOCUMENTS

| | | | |
|---|---|---|---|
| DE | 10 2009 057012 A1 | 6/2011 | |
| DE | 102009057010 A1 * | 6/2011 | B64C 1/1461 |

(Continued)

OTHER PUBLICATIONS

Extended European Search Report dated Sep. 20, 2017 in EP Application No. 17166469.1, 8 pages.

*Primary Examiner* — Richard R Green
*Assistant Examiner* — Bradley W Frazier
(74) *Attorney, Agent, or Firm* — MH2 Technology Law Group LLP

(57) ABSTRACT

A door frame for an aircraft includes first and second beams, each having a first end and a second end. The second beam is substantially parallel to the first beam. A third beam extends from the first end of the first beam to the first end of the second beam. The third beam is substantially perpendicular to the first beam and the second beam. A first flange extends from the second end of the first beam in a direction that is away from the second beam. The first flange is substantially perpendicular to the first beam.

19 Claims, 8 Drawing Sheets

(56) References Cited

U.S. PATENT DOCUMENTS

| | | | |
|---|---|---|---|
| 2005/0211847 A1* | 9/2005 | Pattie | F16L 3/233 |
| | | | 244/129.1 |
| 2007/0007390 A1* | 1/2007 | Doerer | B64C 1/1423 |
| | | | 244/129.5 |
| 2009/0146008 A1* | 6/2009 | Thiele | B64C 1/068 |
| | | | 244/119 |
| 2009/0308977 A1* | 12/2009 | Larcher | B64C 1/062 |
| | | | 244/129.5 |
| 2010/0181426 A1* | 7/2010 | Haack | B64C 1/068 |
| | | | 244/119 |
| 2010/0294888 A1* | 11/2010 | Texcier | B64C 1/1407 |
| | | | 244/129.5 |
| 2012/0211602 A1* | 8/2012 | Dugerie | B64C 1/1461 |
| | | | 244/119 |
| 2013/0164465 A1* | 6/2013 | Lacombe | B64C 1/06 |
| | | | 428/34.1 |
| 2014/0054418 A1* | 2/2014 | Plokker | B64C 1/1461 |
| | | | 244/119 |
| 2014/0367521 A1* | 12/2014 | Joern | B64D 11/02 |
| | | | 244/129.5 |

FOREIGN PATENT DOCUMENTS

| | | | | |
|---|---|---|---|---|
| EP | 1 108 646 A2 | | 6/2001 | |
| EP | 2374713 A2 | * | 10/2011 | B64C 1/1461 |
| GB | 559 897 A | | 3/1944 | |

\* cited by examiner

HAT SECTION DOOR FRAME WITH INTEGRAL GUSSETS

TECHNICAL FIELD

The present teachings relate to the field of aircrafts and, more particularly, to a door frame for an aircraft.

BACKGROUND

Aircrafts include a body referred to as a fuselage. The fuselage includes one or more door frames, and each door frame has a door coupled thereto through which people and cargo may pass when the door is open. A conventional door frame includes multiple parts that are coupled to or integral with one another. For example, a conventional door frame includes a clip that is coupled to the fuselage. An intercostal is coupled to the clip. The intercostal includes an inner flange, an outer flange, a nut plate, and a stiffener. Another clip couples the intercostal to a door stop. Each of these components adds to the weight of the door frame and, thus, the weight of the aircraft, which may increase the amount of fuel used by the aircraft during flight. What is needed is an improved door frame with fewer components, a lesser weight, or a combination thereof.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A door frame for an aircraft is disclosed. The door frame includes first and second beams, each having a first end and a second end. The second beam is substantially parallel to the first beam. A third beam extends from the first end of the first beam to the first end of the second beam. The third beam is substantially perpendicular to the first beam and the second beam. A first flange extends from the second end of the first beam in a direction that is away from the second beam. The first flange is substantially perpendicular to the first beam.

A door frame system is also disclosed. The door frame system includes a first fuselage frame, a second fuselage frame, and a first door frame. The first door frame is positioned between the first and second fuselage frames. The first door frame is substantially parallel to the first and second fuselage frames. The first door frame includes a first beam and a second beam, each having a first end and a second end. The second beam is substantially parallel to the first beam. A third beam extends from the first end of the first beam to the first end of the second beam. The third beam is substantially perpendicular to the first beam and the second beam. A first flange extends from the second end of the first beam in a direction that is away from the second beam. The first flange is substantially perpendicular to the first beam. A second flange extends from the second end of the second beam. The second flange is substantially perpendicular to the second beam. A first sill is substantially perpendicular to the first and second fuselage frames and the first door frame.

In another example, the door frame system includes a first fuselage frame, a second fuselage frame, a third fuselage frame, and a fourth fuselage frame. A first door frame is positioned between the first and second fuselage frames. The first door frame is substantially parallel to the first and second fuselage frames. A second door frame is positioned between the third and fourth fuselage frames. The second door frame is substantially parallel to the third and fourth fuselage frames. The first door frame and the second door frame each include a first beam, a second beam, a third beam, a first flange, and a second flange. The first beam includes a first end and a second end. The second beam includes a first end and a second end. The second beam is substantially parallel to the first beam. The third beam extends from the first end of the first beam to the first end of the second beam. The third beam is substantially perpendicular to the first beam and the second beam. The first flange extends from the second end of the first beam in a direction that is away from the second beam. The first flange is substantially perpendicular to the first beam. The second flange extends from the second end of the second beam. The second flange is substantially perpendicular to the second beam. A door is coupled to the first door frame and the second door frame.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

Figure 1:
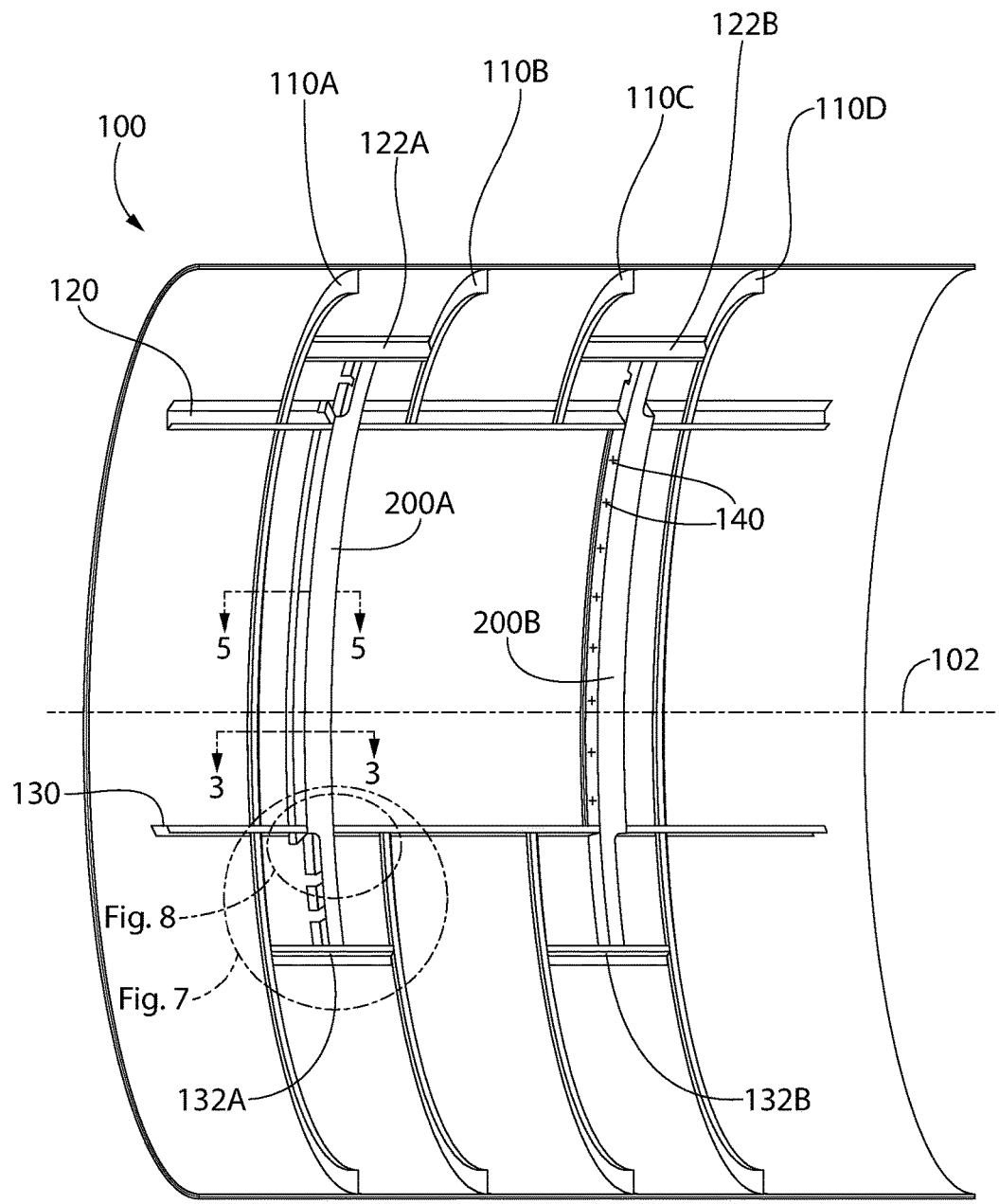
FIG. 1 depicts a perspective view of a door frame system of an aircraft including two door frames, according to an example.
Figure 2:
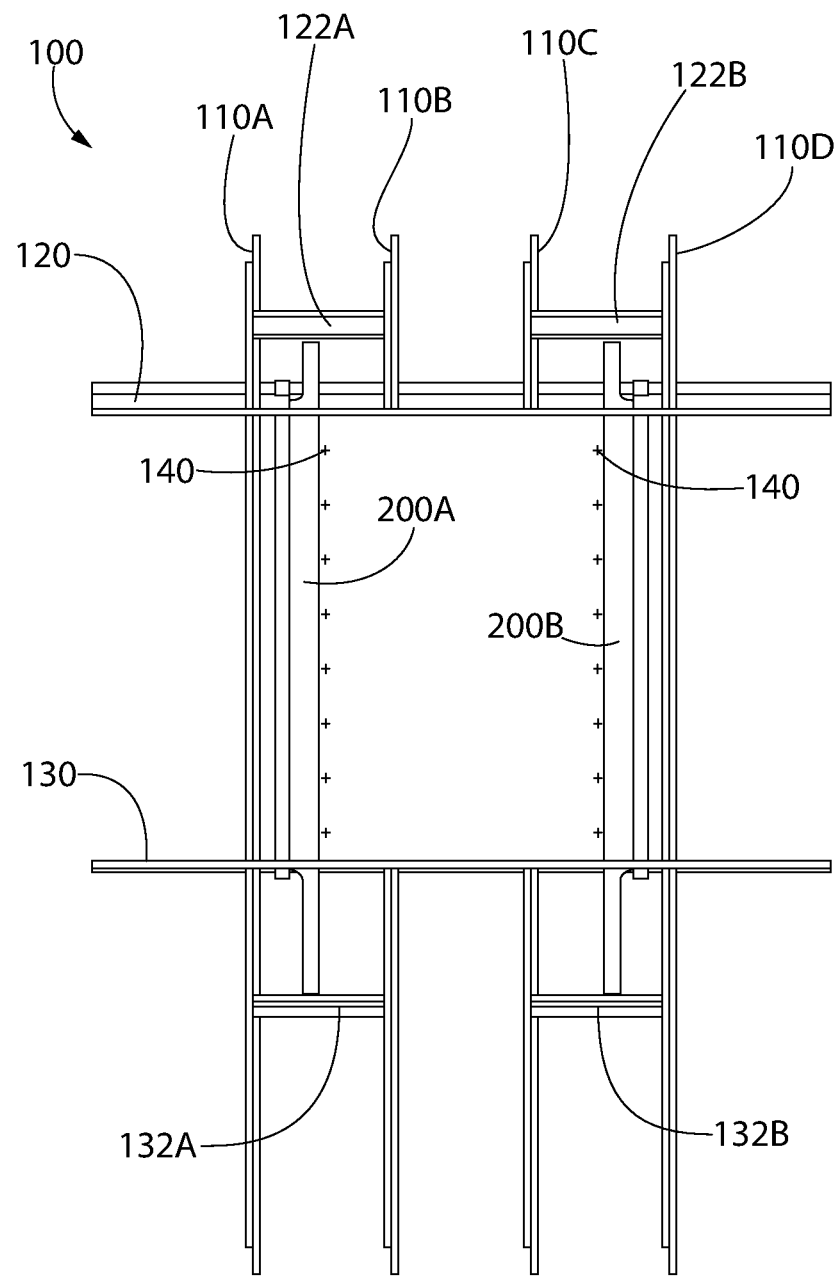
FIG. 2 depicts a front view of the door frame system of the aircraft including the door frame, according to an example.

FIGS. 1 and 2 depict a perspective view and a front view, respectively, of a door frame system 100 of an aircraft including two door frames 200A 200B, according to an example. The aircraft may be an airplane, a helicopter, an unmanned aerial vehicle ("UAV"), or the like. The door frame system 100 includes a plurality of arcuate fuselage frames (four are shown: 110A-D). More particularly, the door frame system 100 includes a first, outer fuselage frame 110A, a second, inner fuselage frame 110B, a third, inner fuselage frame 110C, an a fourth, outer fuselage frame 110D. The fuselage frames 110A-D are spaced axially-apart with respect to a central longitudinal axis 102 through the aircraft. As explained in greater detail below, the door frames 200A, 200B and a door (not shown) are positioned between the outer fuselage frames 110A, 110D.

The door frame system 100 also includes a first, upper sill 120 and a second, lower sill 130. The upper sill 120 and the lower sill 130 are parallel to the central longitudinal axis 102 through the aircraft and perpendicular to the fuselage frames 110A-D. As shown, the outer fuselage frames 110A, 110D may extend through openings formed in the upper sill 120 and the lower sill 130. The outer fuselage frames 110A, 110D may also extend between the upper sill 120 and the lower sill 130. The inner fuselage frames 110B, 110C may terminate proximate to the upper sill 120 and the lower sill 130. Thus, the inner fuselage frames 110B, 110C may be coupled to the upper sill 120 and the lower sill 130 but not extend therebetween to define a gap where the door may be placed. Although not shown, in another example, the outer fuselage frames 110A, 110D may be coupled to the upper sill 120 and the lower sill 130 but not extend therebetween to define a gap.

The door frame system 100 also includes a third, upper auxiliary sill 122 and a fourth, lower auxiliary sill 132. The upper auxiliary sill 122 and the lower auxiliary sill 132 are parallel to the central longitudinal axis 102 through the aircraft and perpendicular to the fuselage frames 110A-D. The upper auxiliary sill 122 is positioned above the upper sill 120, and the lower auxiliary sill 132 is positioned below the lower sill 130 such that the upper and lower sills 120, 130 are positioned between the upper and lower auxiliary sills 122, 132.

A first portion of the upper auxiliary sill 122A is coupled to and extends between the first, outer fuselage frame 110A and the second, inner fuselage frame 110B, and a second portion of the upper auxiliary sill 122B is coupled to and extends between the third, inner fuselage frame 110C and fourth, outer fuselage frame 110D. A gap may be present in the upper auxiliary sill 122 between the two inner fuselage frames 110B, 110C. Similarly, a first portion of the lower auxiliary sill 132A is coupled to and extends between the first, outer fuselage frame 110A and the second, inner fuselage frame 110B, and a second portion of the lower auxiliary sill 132B is coupled to and extends between the third, inner fuselage frame 110C and the fourth, outer fuselage frame 110D. A gap may be present in the lower auxiliary sill 132 between the two inner fuselage frames 110B, 110C.

The door frame system 100 also includes one or more arcuate door frames (two are shown: 200A, 200B) positioned between the outer fuselage frames 110A, 110D. The door frames 200A, 200B may have substantially the same curvature as the fuselage frames 110A-D, as shown in FIG. 1. The first door frame 200A is positioned between the first, outer fuselage frame 110A and the second, inner fuselage frame 110B. As described in greater detail below, the first door frame 200A may be coupled to and/or extend through openings in the upper and lower sills 120, 130. In addition, the first door frame 200A may also be coupled to the first portions of the upper and lower auxiliary sills 122A, 132A. The axial length of the first door frame 200A extends between the upper and lower auxiliary sills 122A, 132A.

The second door frame 200B is positioned between the third, inner fuselage frame 110C and the fourth, outer fuselage frame 110D. The first and second door frames 200A, 200B are substantially identical and mirror images of one another. As such, the second door frame 200B may be coupled to and/or extend through openings in the upper and lower sills 120, 130. In addition, the second door frame 200B may also be coupled to the second portions of the upper and lower auxiliary sills 122B, 132B. The axial length of the second door frame 200B extends between the upper and lower auxiliary sills 122B, 132B. The first and second door frames 200A, 200B are coupled to and support a single door therebetween (not shown in FIGS. 1 and 2).

Each door frame 200A, 200B includes a plurality of door stops 140 (identified by the +signs in FIGS. 1 and 2). The door stops 140 are spaced apart along the length of the door frames 200A, 200B. The door stops 140 may be positioned between the upper and lower sills 120, 130.

Figure 3:
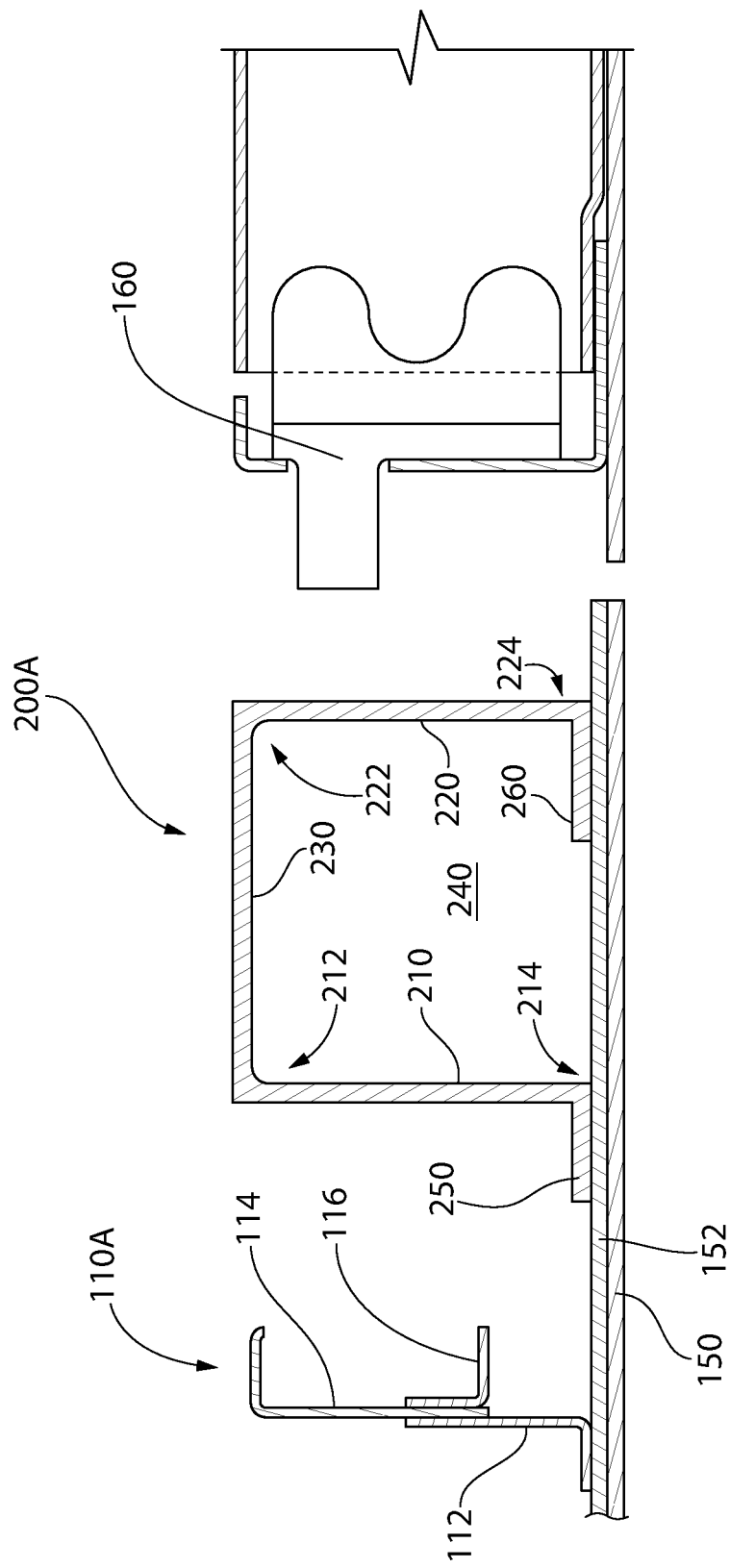
FIG. 3 depicts a cross-sectional view of the door frame system of the aircraft taken through line 3-3 in FIG. 1.

FIG. 3 depicts a cross-sectional view of the door frame system 100 of the aircraft taken through line 3-3 in FIG. 1. FIG. 3 also depicts two layers of fuselage skin 150, 152 and the door 160 to provide a better frame of reference for the reader, even though these components are not shown in FIGS. 1 and 2.

The first, outer fuselage frame 110A may include one or more frame segments (three are shown: 112, 114, 116) that are coupled together or integral with one another. As used herein, two or more components are "integral" with one another when they are formed (e.g., machined) from the same piece of material. The first frame segment 112 may be coupled to the inner layer of fuselage skin 152. The second frame segment 114 may be coupled to or integral with the first frame segment 112 and extend away from the inner layer of fuselage skin 152. The third frame segment 116 may be coupled to or integral with the second frame segment 114. The first, second, and third frame segments 112, 114, 116 may each be substantially L-shaped.

Looking at the cross-sectional view of FIG. 3, the first door frame 200A includes first and second beams 210, 220 that are substantially parallel to one another and substantially perpendicular to the layers of fuselage skin 150, 152. The first and second beams 210, 220 each include a first end 212, 222 that is outer/distal with respect to the layers of fuselage skin 150, 152, and a second end 214, 224 that is inner/proximate with respect to the layers of fuselage skin 150, 152.

The first door frame 200A also includes a third beam 230 that is substantially perpendicular to the first and second beams 210, 220 and substantially parallel to the layers of fuselage skin 150, 152. The third beam 230 is coupled to or integral with the first and second beams 210, 220 proximate to first ends 212, 222 of the first and second beams 210, 220. Thus, cross-section of the first, second, and third beams 210, 220, 230 may be substantially C-shaped. A hollow, internal volume 240 is defined/bounded by the first, second, and third beams 210, 220, 230 of the first door frame 200A and the inner layer of fuselage skin 152.

The first door frame 200A may also include first and second flanges 250, 260. The first and second flanges 250, 260 are substantially perpendicular to the first and second beams 210, 220 and substantially parallel to the third beam 230 and the layers of fuselage skin 150, 152. The first and second flanges 250, 260 may be coupled to the inner layer of fuselage skin 152 using, for example, one or more bolts (not shown).

The first flange 250 is coupled to or integral with the first beam 210 proximate to the second end 214 of the first beam 210. As shown, the first flange 250 may extend from the first beam 210 in a direction that is away from the second beam 220 (and toward the first, outer fuselage frame 110A). In other examples, the first flange 250 may extend from the first beam 210 in a direction that is toward from the second beam 220 (and away from the first, outer fuselage frame 110A). The first flange 250 may serve to stabilize the door stop 140.

Figure 4:
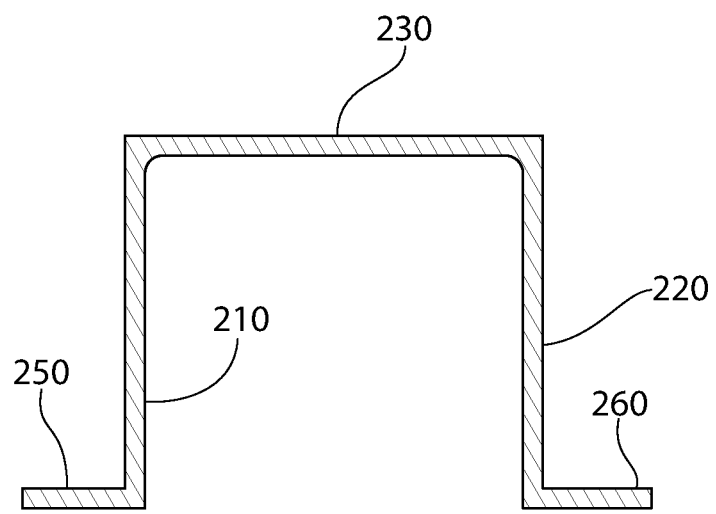
FIG. 4 depicts a cross-sectional view of an alternative example of the door frame.

The second flange 260 is coupled to or integral with the second beam 220 proximate to the second end 224 of the second beam 220. As shown, the second flange 260 may extend from the second beam 220 in a direction that is toward from the first beam 210 (and away from the door 160). Having the second flange 260 oriented in this direction may reduce the distance between the first door frame 200A and the door 160, which may reduce the torsional load on the first door frame 200A and allow it to have a lighter weight. In another example, the second flange 260 may extend from the second beam 220 in a direction that is away from the first beam 210 (and toward from the door 160). This example may resemble a top hat and is shown in FIG. 4.

In at least one example, the first door frame 200A, including the first beam 210, the second beam 220, the third beam 230, the first flange 250, and the second flange 260 may be a single, integral component made of metal (e.g., aluminum). The first door frame 200A of this construction may be easier and cheaper to fabricate and install than the conventional built-up frame-intercostal-frame arrangement.

Figure 5:
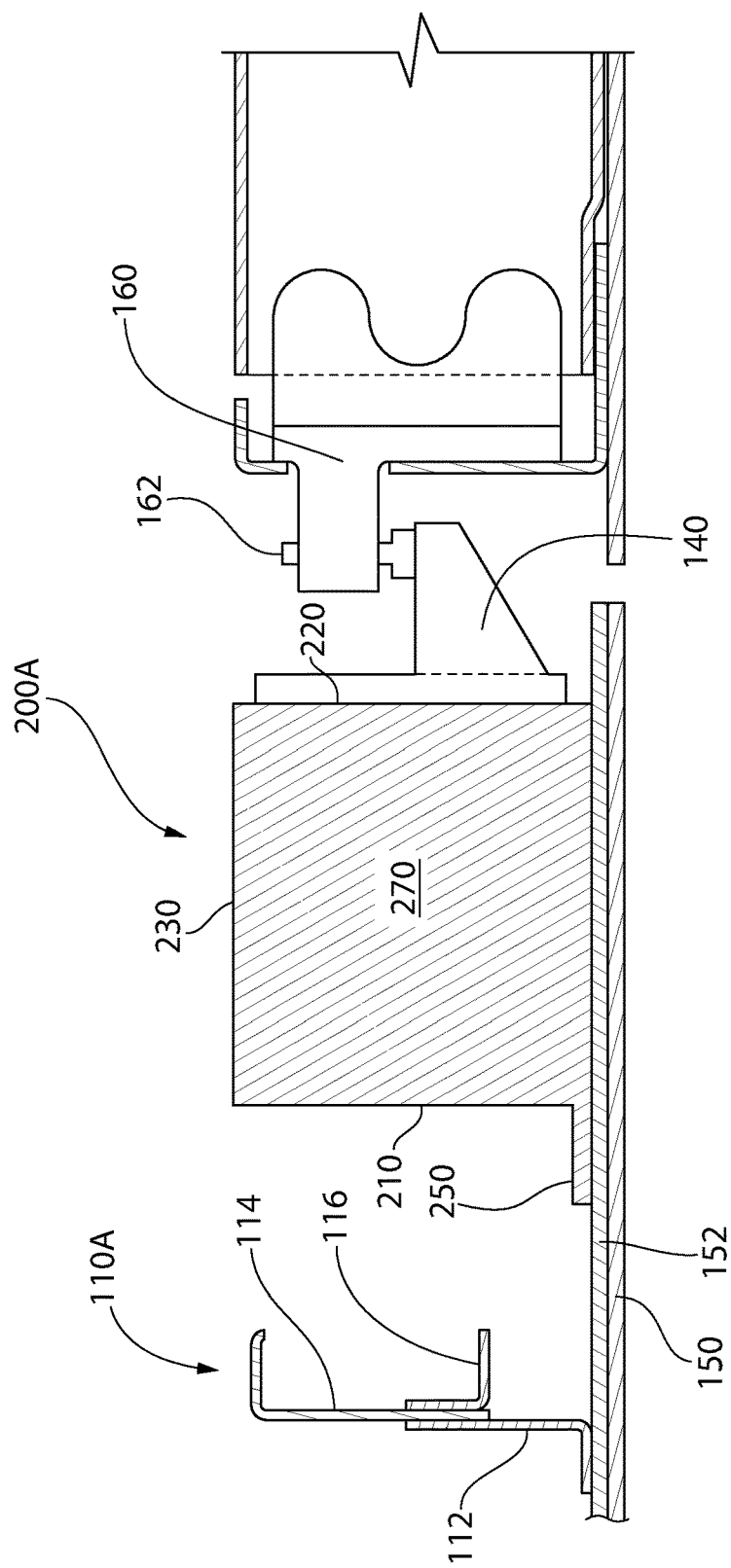
FIG. 5 depicts a cross-sectional view of the door frame system of the aircraft taken through line 5-5 in FIG. 1.

FIG. 5 depicts a cross-sectional view of the door frame system 100 of the aircraft taken through line 5-5 in FIG. 1. As shown, a first of the door stops 140 is coupled to or integral with the second beam 220 of the first door frame 200A. The door stop 140 is positioned on a side of the second beam 220 that is farther from the first beam 210 and closer to the door 160. As such, the door stop 140 extends away from the second beam 220 and toward the door 160. One or more bolts (one is shown: 162) may be used to couple the door 160 to the door stop 140. The door 160 may rotate about the door stop 140 when the door 160 is being opened and closed.

An internal gusset 270 may be positioned in the internal volume 240 (see FIG. 3) of the first door frame 200A at portions of the door frame 200A that are axially-adjacent to the door stops 140. The internal gusset 270 is coupled to or integral with the first, second, and third beams 210, 220, 230. The internal gusset 270 may be made of the same material as the first, second, and third beams 210, 220, 230. The internal gusset 270 may serve to strengthen the door frame 200A proximate to the door stop 140, where the door frame 200A experiences the greatest torsional loads.

Figure 6:
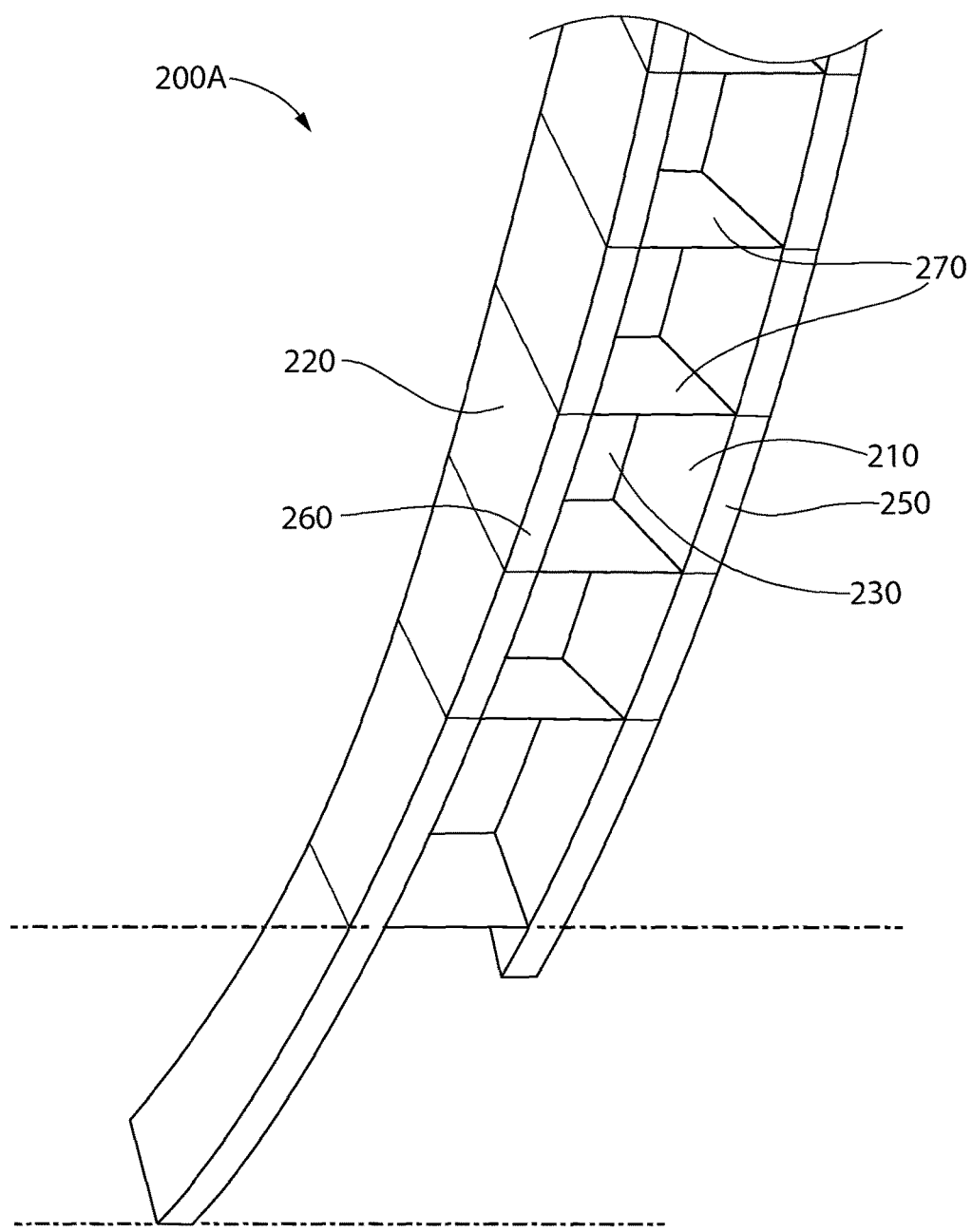
FIG. 6 depicts a perspective view of the door frame shown in FIGS. 1-3 illustrating a plurality of internal gussets, according to an example.

FIG. 6 depicts a perspective view of the first door frame 200A shown in FIGS. 1-3 illustrating a plurality of internal gussets 270, according to an example. While FIGS. 1 and 2 are outboard views, FIG. 6 is an inboard view with the fuselage skin 150, 152 omitted to show the internal gussets 270. As shown, the internal gussets 270 may be axially-aligned with the door stops 140 along the length of the door frame 200A. As such, the internal gussets 270 are spaced axially-apart along the length of the door frame 200A (i.e., between the upper auxiliary sill 122A, B and the lower auxiliary sill 132A, B). The internal gussets 270 may have an axial thickness ranging from about 1 mm to about 10 mm or from about 2 mm to about 5 mm.

Figure 7:
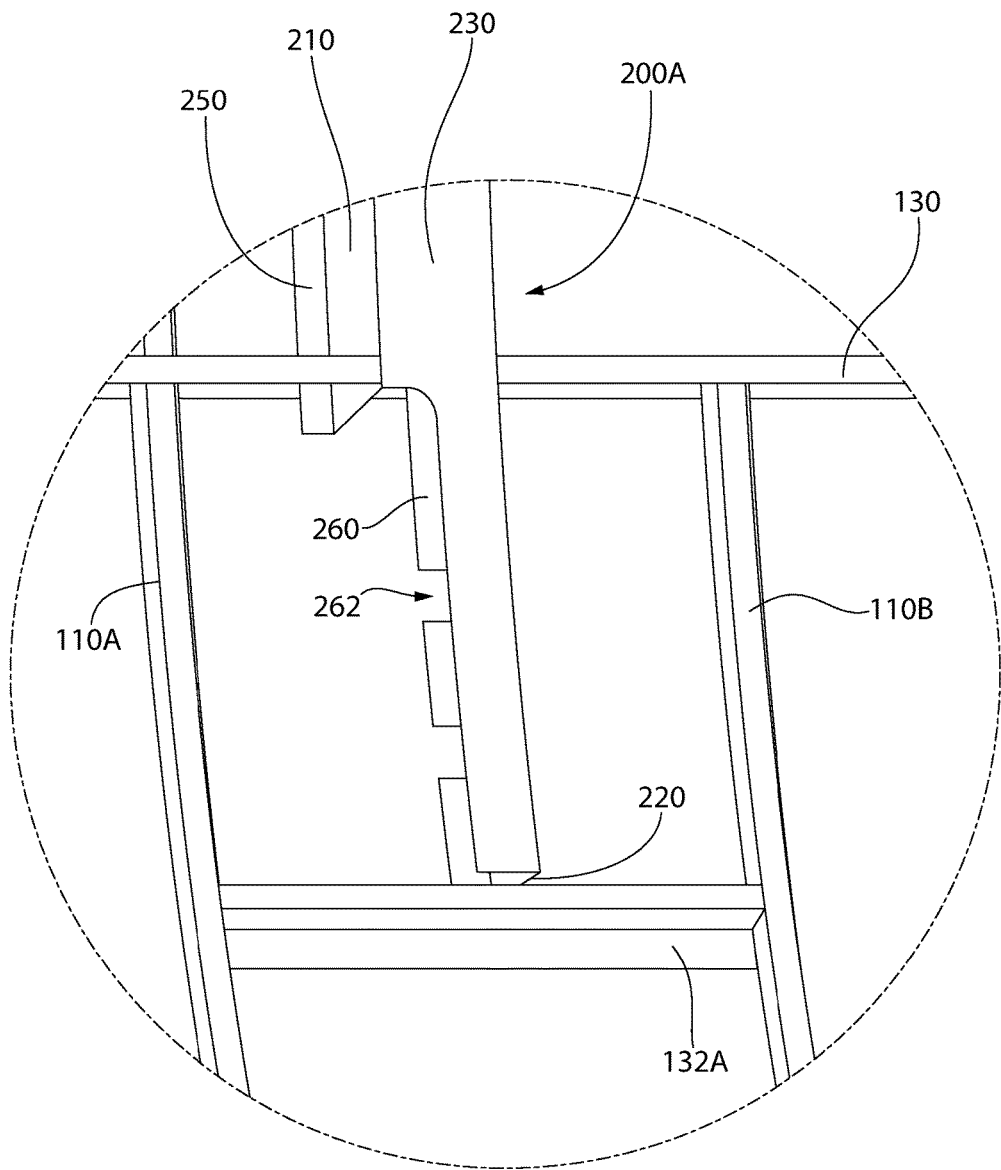
FIG. 7 depicts an enlarged perspective view of a portion of FIG. 1, according to an example.

FIG. 7 depicts an enlarged perspective view of a portion of FIG. 1 showing the first door frame 200A, the lower sill 130, and the lower auxiliary sill 132A, according to an example. The lower sill 130 may extend through openings in the first and second beams 210, 220 of the first door frame 200A.

The first flange 250 of the first door frame 200A may be omitted or removed below the lower sill 130 because there are no door stops 140 below the lower sill 130 (and the first flange 250 is used to stabilize the door stops 140). As shown, in some examples, in addition to the first flange 250, the first beam 210 and at least some of the third beam 230 may also be omitted or removed below the lower sill 130. As a result, the first door frame 200A may have a substantially C-shaped cross-section between the lower sill 130 and the lower auxiliary sill 132A.

One or more notches 262 may be formed in the second flange 260. More particularly, the notches 262 may be formed in the second flange 260 between the lower sill 130 and the lower auxiliary sill 132A. The notches 262 may be spaced axially-apart along the length of the first door frame 200A. Although not shown, stringers may be positioned in and/or extend through the notches 262. The stringers may provide axial stiffness to the panel. The lower end 202A of the first door frame 200A may be coupled to the lower auxiliary sill 132A or spliced to another structural support member (e.g., frame).

Figure 8:
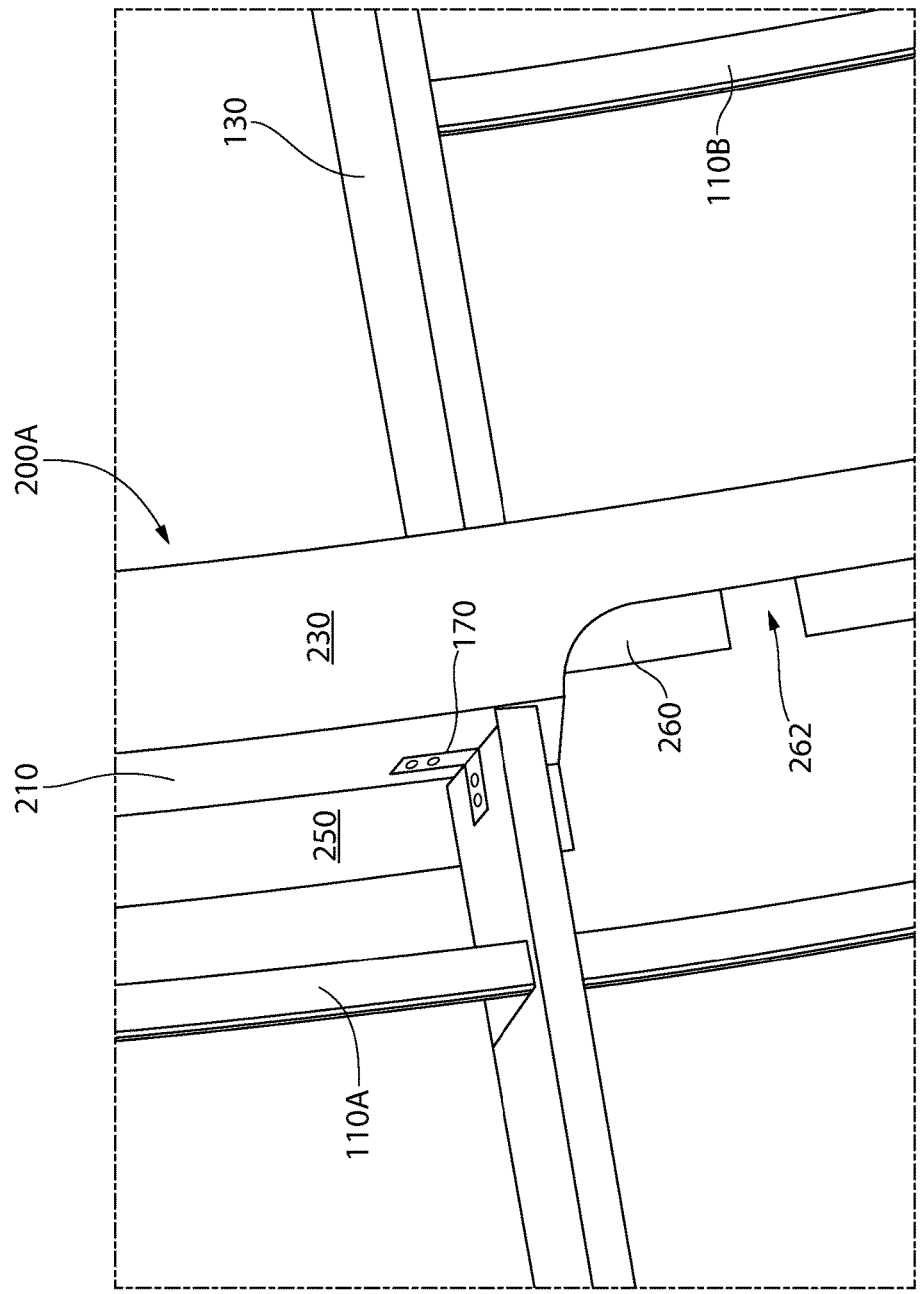
FIG. 8 depicts an enlarged perspective view of another portion of FIG. 1, according to an example.

FIG. 8 depicts an enlarged perspective view of another portion of FIG. 1 showing the first door frame 200A and the lower sill 130, according to an example. One or more clips 170 may be used to couple the first door frame 200A to the lower sill 130. The engagement of the first door frame 200A to the upper sill 120 and/or the upper auxiliary sill 122A may be a mirror-image with the engagement of the first door frame 200A to the lower sill 130 and/or the lower auxiliary sill 132A described above. In addition, the engagement of the second door frame 200B to the lower sill 130 and/or the lower auxiliary sill 132B may be a mirror-image with the engagement of the first door frame 200A to the lower sill 130 and/or the lower auxiliary sill 132A described above.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. Finally, "exemplary" indicates the description is used as an example, rather than implying that it is an ideal. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A door frame for an aircraft, comprising:
    a first beam including a first end and a second end;
    a second beam including a first end and a second end, wherein the second beam is substantially parallel to the first beam;
    a third beam extending from the first end of the first beam to the first end of the second beam, wherein the third beam is substantially perpendicular to the first beam and the second beam; and
    a first flange extending from the second end of the first beam in a direction that is away from the second beam, wherein the first flange is substantially perpendicular to the first beam, and wherein the first flange, the first beam, and a portion of the third beam are removed along a portion of an axial length of the door frame.

2. The door frame of claim 1, wherein the first, second, and third beams are arcuate in shape.

3. The door frame of claim 1, wherein the first beam, the second beam, the third beam, and the first flange are integral with one another.

4. The door frame of claim 1, further comprising a second flange extending from the second end of the second beam, wherein the second flange is substantially perpendicular to the second beam.

5. The door frame of claim 4, wherein the second flange extends from the second beam in a direction that is away from the first beam.

6. The door frame of claim 4, wherein the second flange extends from the second beam in a direction that is toward the first beam.

7. The door frame of claim 6, wherein the second flange defines a plurality of notches that are spaced axially-apart along an axial length of the door frame, and wherein a length of the first flange and the first beam that is removed is greater than a length of each notch.

8. The door frame of claim 1, further comprising:
    a door stop coupled to the second beam; and
    an internal gusset that is integral with the first beam, the second beam, and the third beam, wherein the internal gusset is substantially axially-aligned with the door stop, and wherein the internal gusset has an axial thickness from about 1 mm to about 10 mm.

9. A door frame system, comprising:
    a first fuselage frame;
    a second fuselage frame;
    a first door frame positioned between the first and second fuselage frames, wherein the first door frame is substantially parallel to the first and second fuselage frames, and wherein the first door frame comprises:
        a first beam including a first end and a second end;
        a second beam including a first end and a second end, wherein the second beam is substantially parallel to the first beam;
        a third beam extending from the first end of the first beam to the first end of the second beam, wherein the third beam is substantially perpendicular to the first beam and the second beam;
        a first flange extending from the second end of the first beam in a direction that is away from the second beam, wherein the first flange is substantially perpendicular to the first beam, and wherein the first flange, the first beam, and a portion of the third beam are removed along a portion of an axial length of the first door frame; and
        a second flange extending from the second end of the second beam, wherein the second flange is substantially perpendicular to the second beam; and
    a first sill that is substantially perpendicular to the first and second fuselage frames and the first door frame.

10. The door frame system of claim 9, further comprising a second sill that is substantially parallel to the first sill, wherein the first fuselage frame and the first door frame extend between the first and second sills, and wherein the second fuselage frame does not extend between the first and second sills.

11. The door frame system of claim 9, further comprising a second sill that is substantially parallel to the first sill, wherein the first door frame extends between the first and second sills, and wherein the first fuselage frame and the second fuselage frame do not extend between the first and second sills.

12. The door frame system of claim 9, further comprising a layer of fuselage skin, wherein the first and second flanges are substantially parallel to and coupled to the layer of fuselage skin.

13. The door frame system of claim 9, further comprising a first auxiliary sill positioned between the first and second fuselage frames, wherein a portion of the first flange is removed between the first sill and the first auxiliary sill.

14. The door frame system of claim 9, wherein the second flange extends from the second beam in a direction that is toward the first beam.

15. The door frame system of claim 14, further comprising a door stop coupled to the second beam.

16. The door frame system of claim 15, further comprising an internal gusset that is integral with the first beam, the second beam, and the third beam, wherein the internal gusset is substantially aligned with the door stop, and wherein the internal gusset has an axial thickness from about 1 mm to about 10 mm.

17. The door frame system of claim 15, further comprising:
    a second sill that is substantially parallel to the first sill;
    a third fuselage frame, wherein the second fuselage frame is axially-between the first and third fuselage frames;
    a fourth fuselage frame, wherein the third fuselage frame is axially-between the second and fourth fuselage frames;
    a second door frame positioned axially-between the third and fourth fuselage frames, wherein the fourth fuselage frame and the second door frame extend between the first and second sills, and wherein the third fuselage frame does not extend between the first and second sills; and a door positioned between the first door frame, the second door frame, the first sill, and the second sill.

18. The door frame system of claim 17, further comprising a first auxiliary sill positioned between the first and second fuselage frames and between the third and fourth fuselage frames, wherein a gap is present in the first auxiliary sill between the second and third fuselage frames.

19. A door frame system, comprising:

a first fuselage frame;

a second fuselage frame;

a third fuselage frame;

a fourth fuselage frame;

a first door frame positioned between the first and second fuselage frames, wherein the first door frame is substantially parallel to the first and second fuselage frames;

a second door frame positioned between the third and fourth fuselage frames, wherein the second door frame is substantially parallel to the third and fourth fuselage frames, and wherein the first door frame and the second door frame each comprise:

a first beam including a first end and a second end;

a second beam including a first end and a second end, wherein the second beam is substantially parallel to the first beam;

a third beam extending from the first end of the first beam to the first end of the second beam, wherein the third beam is substantially perpendicular to the first beam and the second beam;

a first flange extending from the second end of the first beam in a direction that is away from the second beam, wherein the first flange is substantially perpendicular to the first beam, and wherein the first flange, the first beam, and a portion of the third beam are removed along a portion of an axial length of the first door frame and the second door frame; and a second flange extending from the second end of the second beam, wherein the second flange is substantially perpendicular to the second beam; and a door coupled to the first door frame and the second door frame.

* * * * *